Oct. 4, 1966                E. A. G. SHAW                3,276,535
PROBE MICROPHONE WITH HORN COUPLING
Filed April 8, 1963                                3 Sheets-Sheet 1

INVENTOR
EDGAR A.G. SHAW
BY- Smart & Biggar.
ATTORNEYS

Oct. 4, 1966 E. A. G. SHAW 3,276,535
PROBE MICROPHONE WITH HORN COUPLING
Filed April 8, 1963 3 Sheets-Sheet 3

INVENTOR
EDGAR A.G. SHAW
BY- Smart & Biggar.
ATTORNEYS

United States Patent Office 3,276,535
Patented Oct. 4, 1966

3,276,535
PROBE MICROPHONE WITH HORN COUPLING
Edgar A. G. Shaw, Ottawa, Ontario, Canada, assignor to National Research Council, Ottawa, Ontario, Canada, a body corporate
Filed Apr. 8, 1963, Ser. No. 271,320
Claims priority, application Canada, Oct. 19, 1962, 860,508
17 Claims. (Cl. 181—.5)

This invention relates to probe microphones used for the measurement of acoustic phenomena.

In the testing and analysis of acoustic devices it is found necessary to utilize apparatus and techniques which will permit quantitative determination of sound levels in relatively confined spaces under circumstances in which the procedure used causes the minimum possible disturbance to the system being investigated. As a result of requirements of this type probe microphones have been developed whereby one end of a relatively long, thin tube is inserted in the region where the measurement is to be made, the tube being used as an acoustic conduit leading to a microphone disposed at its other end. By this means the microphone is made more or less responsive to the acoustic phenomena occurring in the region of the first-mentioned end of the tube. Devices of this type have been used for a number of years, but they have, however, exhibited a number of unsatisfactory characteristics including very poor high frequency response which greatly reduces the applicability of probe microphone techniques.

During the past decade a good deal of work has been done to clarify the behaviour of probe microphones. It is now clear that the high frequency performance of such microphones is dominated by the disparity between the high characteristic wave impedance of the small diameter probe tube and the relatively low acoustic impedance of the microphone itself. The characteristic wave impedance of a probe tube of cross-sectional area $S$ is $\rho c/S$, where $\rho$ is the density and $c$ the sound velocity of the gas in the tube, while the impedance of a good condenser microphone with its coupling cavity may be written $\rho c^2/j\omega V_1$, where $\omega$ is the angular frequency and $V_1$ is the effective coupling volume. These are equal in magnitude when $\omega = cS/V_1$, or $\nu_1 = cS/2\pi V_1$, where $\nu_1$ may be termed the critical frequency. Taking typical values $S=0.01$ cm.$^2$, $V_1=0.2$ cm.$^3$, $c=3.4\times 10^4$ cm. sec.$^{-1}$, we find $\nu_1=270$ c.p.s. In a typical well-designed prior art probe microphone, therefore, the response is virtually that of the microphone itself up to this critical frequency. Above this frequency, the response falls by about 6 db/octave and thus may have fallen by 30 db or more at 10 kc./s., a circumstance which affects very seriously the applicability of conventional probe microphone measurements.

I have found that a greatly improved device for measuring sound pressure levels can be obtained by using a horn to couple a uniform probe tube to a microphone. In accordance with my invention, the uniform probe tube is attached to the small end of the horn with the larger end being coupled to the microphone and to an acoustic resistance element. In preferred embodiments of my invention I arrange for the resistance element to be vented into a finite cavity or enclosure which can, for instance, consist of an acoustic circuit having two acoustic capacitances and one inertance.

The use of an acoustic horn as an impedance transformer to improve the transmission of acoustic power is well known (see, for example, H. F. Olson, "Acoustical Engineering," p. 112-113, D. Van Nostrand Company, Inc., New York 1957). In such applications useful transmission occurs only above the cut-off frequency of the horn. It is an important feature of my invention that the horn is used in a manner which permits useful operation both above and below the cut-off frequency. This is possible since the condenser microphone is a pressure-sensitive device which absorbs negligible acoustic power. Hence useful transmission is measured not in terms of power transfer but in terms of acoustic pressure transfer.

My invention will be described with reference to the following figures of drawings in which.

Figure 1:
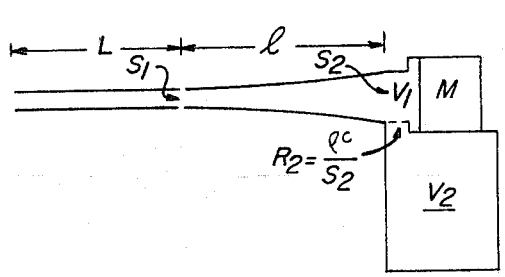
FIGURE 1 illustrates "in essence" a horn coupled condenser probe microphone made in accordance with my invention.

Referring now to FIGURE 1, which shows in diagrammatic form the essential elements of a horn coupled condenser microphone in accordance with my invention, a uniform tube of length $L$ is coupled to the smaller end of a horn section of length $l$. The larger end of the horn section is coupled to a condenser microphone designated by M which with the coupling cavity has an effective volume $V_1$ and to an acoustic resistance R which is a perfect termination for the horn under ideal conditions. This resistance R is vented into a large cavity $V_2$.

Figure 2:
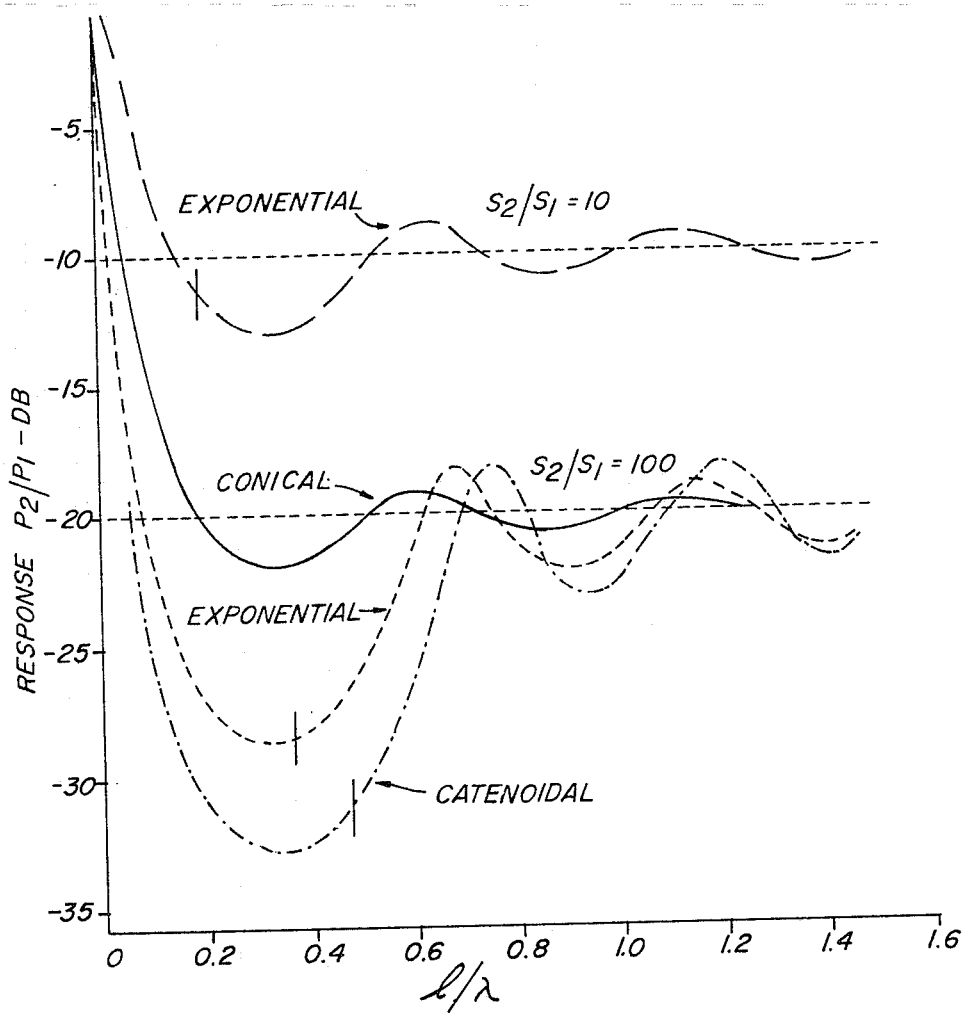
FIGURE 2 illustrates theoretical response curves for limiting forms of the system shown in FIGURE 1 in which the uniform probe tube is omitted and an infinite impedance microphone is assumed.

FIGURE 2 shows theoretical response curves for limiting forms of such a system in which the uniform probe tube is omitted (i.e. $L=0$) and an infinite impedance microphone is assumed. The curves are drawn for three types of horn, conical, exponential and catenoidal, and for two values of the parameter $S_2/S_1$ where $S_2$ and $S_1$ are the cross sectional areas of the larger and smaller ends of the horn, respectively. These curves provide a theoretical basis for explaining the improved performance available from probe tube microphones made in accordance with my invention. The pressure response $P_2/P_1$ is shown as a function of the dimension-less parameter $l/\lambda$, where $\lambda = C\nu$ is the free field wave length corresponding to the operating frequency $\nu$. There is a low frequency region in which the microphone pressure $P_2$ approaches the orifice pressure $P_1$. At high frequencies the response is asymptotic to the appropriate value for a horn operating as a normal power transmission device, i.e., $-20$ db when $S_2/S_1=100$ and $-10$ db when $S_2/S_1=10$. Between these regions there is a broad region of relatively low response with a minimum in the vicinity of $l/\lambda = 1/3$. This transition region includes the cut-off frequency $\nu_c$ of exponential and catenoidal horns, indicated by the vertical marks. It will be noted that the depth of the dip becomes greater as one passes from conical to exponential to catenoidal horns and from smaller to greater values of $S_2/S_1$. It has also been found that the dip is more pronounced when a finite length of uniform probe tube is added (i.e. $L \neq 0$). For a given horn shape the depth of the dip is increased when the ratio of uniform probe tube length to horn length (i.e. $L/l$) is increased.

Now if the horn cut-off frequency $\nu_c$ could be set sufficiently low one need not be concerned with anything but the normal power transmission region. However, if the horn were a few metres long as would be necessary to have normal power transmission from 20 c.p.s. and up, the thermal and viscous boundary layer attenuation would be quite prohibitive at high frequencies. As an example, consider an exponential horn having $S_1=0.005$ cm.$^2$, $S_2/S_1=13$ and $\nu_c=20$ c.p.s. It may readily be shown that such a horn has a length $l=(C/4\pi\nu_c)\log_e(S_2/S_1\approx 350$ cm. With such great length the boundary layer losses would exceed 100 db at 10000 c.p.s. Since this is ten to twenty times the acceptable attenuation, one is forced to limit the length to about 15 to 20 cm. by choosing a cut-off frequency not much lower than 500 c.p.s. On the other hand, it is desirable to minimize the transition region dip by keeping $l/L$, and hence $l$ as large as possible. An unnecessarily high cut-off frequency is therefore to be avoided.

The critical frequency for a horn coupled probe microphone is $\nu_2=cS_2/2\pi V_1$. In principle, for a given value of $V_1$ a value of $S_2$ can always be chosen such that $\nu_2$ will have an adequately large predetermined value (say 10000 cycles/sec.). However, the larger the value of $S_2$ and hence, of $S_2/S_1$ the lower the sensitivity in the normal power transmission region. $V_1$ should therefore be made as small as possible by minimizing the size of the coupling cavity and, in particular by placing the terminal resistance as close to the microphone diaphragm as possible.

If the horn is to be properly terminated the acoustic resistance R should not deviate significantly from the characteristic wave impedance of the larger end of the horn $\rho c/S_2$ up to the critical frequency. This requirement can only be met with a structure in which air flows through passages not much larger than the thickness of the viscothermal boundary layer, which is about 0.005 cm. at 10000 c.p.s.

If the terminal resistance were left open to the atmosphere, the microphone would respond to sounds other than those transmitted by the probe tube. This can be avoided by venting the resistance into an acoustic enclosure or cavity of volume $V_2$ which should have a volume large enough to avoid rendering the resistance ineffective at all significant frequencies. If $\nu_0$ is the lowest frequency of interest, it is required that the acoustic enclosure have a volume $$V_2 > \rho c^2/2\pi R \nu_0$$

or substituting $R=\rho c/S_2$, $$V_2 > S_2 c/2\pi \nu_0$$

Figure 3:
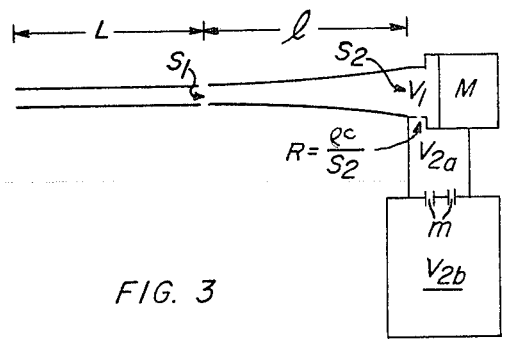
FIGURE 3 illustrates a more elaborate arrangement of the system shown generally in FIGURE 1, in which the simple venting cavity is replaced by an acoustic network.

A further improvement may be effected by replacing the simple acoustic enclosure comprising a single cavity of volume $V_2$ by a network of acoustic circuit elements. In particular, as shown in FIGURE 3, if the resistance R is vented into an acoustic capacitance having a volume $V_{2a}$ of the order of $S_2c/2\pi\nu_c$, where $\nu_c$ is the horn cut-off frequency, which is coupled to a much larger acoustic capacitance of volume $V_{2b}$ via a damped inertance $m$, the transition frequency dip may be virtually eliminated. The inertance $m$ and volume $V_{2a}$ form a Helmholtz resonator which should resonate near the horn cut-off frequency. To achieve optimum results the magnitudes of $V_{2a}$ and $m$ and the amount of damping all require adjustment. This is most readily accomplished by trial and error.

Finally, if desired, the low frequency response of the microphone may be reduced to a uniform level by introducing a small resistance into the probe orifice. The uniform probe tube, if of small bore and considerable length, may introduce sufficient resistance for this purpose.

Figure 4:
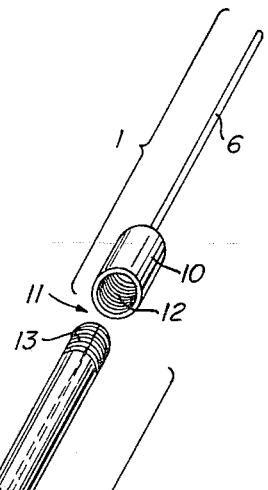
FIGURE 4 is an "exploded" view of an embodiment of my invention which incorporates the principles discussed in connection with FIGURE 3.
Figure 4:
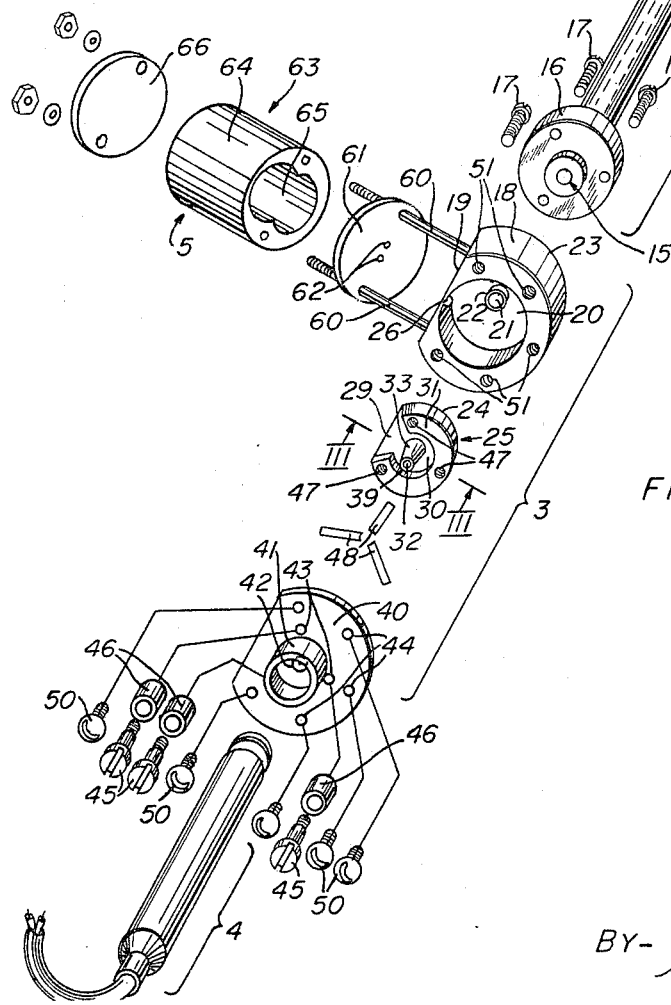

In connection with FIGURES 4 and 5 a description will now be given of one embodiment of my invention which has yielded very satisfactory improved performance over prior probe microphone designs. As shown in FIGURE 4, the whole assembly may conveniently be regarded as having four main parts—i.e. a uniform probe tube, a horn, a terminal section and a microphone assembly, generally represented by the reference numerals 1, 2, 3 and 4 respectively.

The probe tube 1 comprises a length of good quality metal tubing 6 for instance stainless steel hypodermic tubing. This is attached by means of a brass ferrule 10 to the smaller end 11 of the horn 2, for example, by means of the internal and external threads 12, 13 as shown. It is, of course, essential that the inside diameter of the probe tube be the same as the small end of the horn and that the openings be maintained in registry with each other in a completely airtight manner.

As will be apparent to persons skilled in the art, the horn 2 may itself be fabricated from many different materials; as a matter of convenience in exercising control over the accuracy of the dimensions of the "bore" which defines the shape of the horn, I have found a plastic molding to be satisfactory. The bore 14 itself may define a horn of a number of different shapes such as, for instance, conical exponential and catenoidal. The best compromise between practical and theoretical considerations appears to be the exponential horn. At the large end 15 of the horn 2, there is disposed an outwardly extending annular flange 16 having therein a plurality of holes which permit the horn, by means of machine screws 17 to be rigidly attached to the housing 18 of the terminal section 3.

As shown in FIGURE 4, the housing 18 is of cylindrical configuration with a flat side 19 and a cylindrical chamber 20. At the centre of the bottom of the chamber 20 is an aperture 21 which locates a pliable gasket 22, fabricated for instance of rubber or soft plastic, adapted to produce a good acoustic connection between the larger end 15 of the horn 2 mounted on the front side 23 of the housing 18 on the one end, and the end of the aperture 32 which passes through the centre of the knife edge 25 referred to below. The housing is also provided with an aperture 26 centrally located on the flat side 19.

Figure 5:
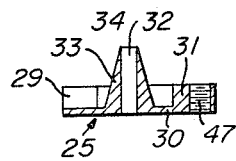
FIGURE 5 is a view in section taken along lines III—III of FIGURE 4.

A knife edge member 25 of which a cross section view is given in FIGURE 5, is so dimensioned as to fit within the chamber 20. As shown, the member 25 has a base 30 around the greater part of the circumference of which is disposed an annular flange 31; on the side corresponding to the flat side 19 of the housing 18, a section of the flange 31 is "removed" so as to form a gap 29. At the centre of the member is a circular aperture 32 surrounded by a raised conical flange 33 defining a "conical knife edge" 34 at the upper end thereof. As will be apparent from FIGURE 4, when the member 25 is disposed within the chamber 20, the lower end of the aperture 32 makes contact with the gasket 22 so as to effect a good acoustical connection with the larger end 15 of the horn 2 which is rigidly mounted on the other side of the housing 18.

A flat cover plate 40 having a shape corresponding with that of the outside surface of the housing 18 is provided with a centrally located collar 41 adapted for engagement with microphone assembly 4. The cover plate 40 comprises a central aperture 42 and two concentric sets of apertures 43, 44 disposed at convenient locations around the plate outside the collar 41. The inner apertures 43 are adapted to accommodate machine screws 45 which are threaded through spring-like members here shown as lengths of rubber tubing 46 and thence into complementary threaded apertures 47 disposed in the flange 31 of knife-edge member 25. Shims 48 comprising thin pieces of steel are placed between the mutually facing surfaces of the flange 31 and the cover plate 40 so as to cause the knife edge 34 to be disposed a predetermined distance away from the surface of the cover plate 40 surrounding the central aperture 42. It will be appreciated that by resorting to an arrangement involving shims and "spring loaded" mounting screws of this type, it is possible to exercise conveniently very careful control over the characteristics of the acoustic resistance defined by the knife edge 34 and the aperture 42. The outer apertures 44 are designed to take machine screws 50 which are threaded into complementary holes 51 disposed on the mating surface of the housing 18.

Referring now to the acoustic structure generally indicated at 5, which forms part of the terminal unit 3, it will be seen that threaded rods 60 extend outwardly from each end of the flat surface 19 of the housing. In the particular embodiment illustrated, an inertance member comprising a flat plate 61 having for example two relatively smaller centrally located apertures 62, is mounted on the rods for engagement against the flat surface 19 of the housing, the apertures 62 registering with the aperture 26 in the wall of the housing. An acoustic capacitance member 63, shown as comprising a cylinder 64 having a chamber 65 is also disposed on the threaded rods; if desired the cavity may be filled with a sound-absorbing material such as for example, foamed polyurethane which will serve to damp out standing waves at high frequencies. Finally, a closure member 66 in the form of a plain disk is advanced along the threaded rods 60 following which the several parts are drawn into tight engagement by means of washers and nuts as shown. The arrangement is such that the resistance is vented into a first acoustic capacitance, comprising the unoccupied space within the chamber 20 (corresponding to $V_{2a}$ in FIGURE 3) which is in turn coupled to the much larger acoustic capacitance provided by member 63 ($V_{2b}$ in FIGURE 3) through an inertance ($m$ in FIGURE 3) provided by plate 61, thus forming an acoustic network.

Figure 6:
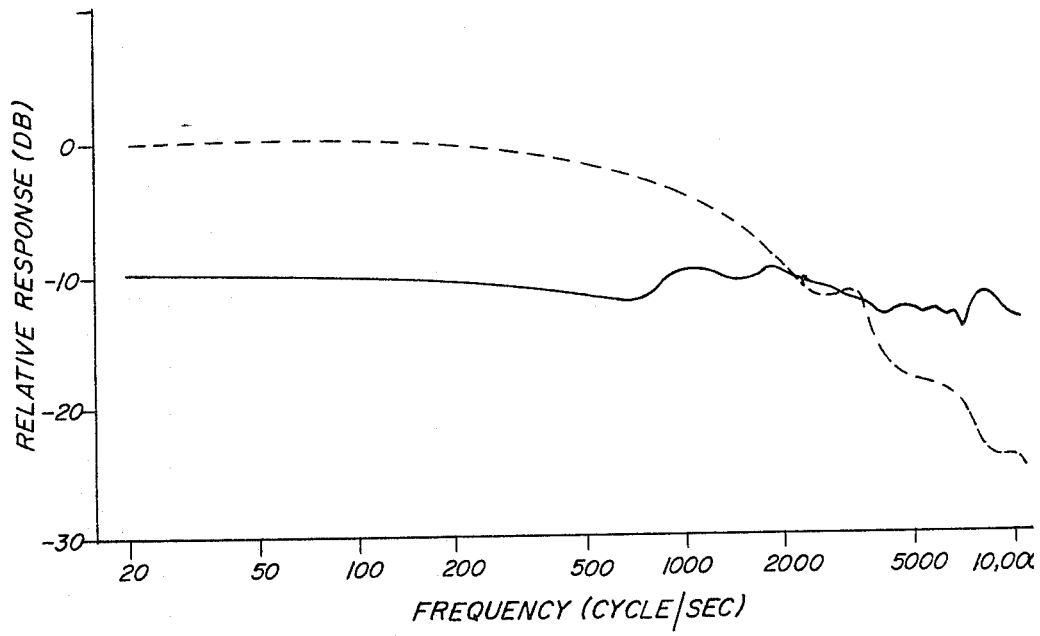
FIGURE 6 shows a response curve for a probe microphone of the type illustrated in FIGURES 4 and 5.

FIGURE 6 (solid line) shows a response curve for a probe microphone made in accordance with the invention. The particular example in question was one having a uniform probe tube 6 of about 0.8 mm. internal diameter ($S_1$=0.005 cm.$^2$) and length $L$=5 cm., an exponential horn 2 of length $l \simeq 16$ cm. with an area ratio $S_2:S_1 \simeq 13:1$ and a cut-off frequency $\nu_c$=425 c.p.s. feeding a Bruel and Kjaer condenser microphone type 4134. The terminal resistance was of the type shown in FIGURES 4 and 5—i.e. an annular slot—designed to behave as a pure resistance up to 10 kc./s. and located immediately ahead of the microphone. The terminal resistance was vented into an acoustic network comprising an acoustic capacitance having a volume $V_{2a}$ of about 1 cm.$^3$ volume, a damped inertance $m$ chosen to resonate with $V_{2a}$ at about 500 c.p.s., and a very large, essentially infinite acoustic capacitance having a volume $V_{2b}$. The broken line curve shows the estimated response curve of a comparable prior art probe microphone. It will be noted that the horn coupled probe microphone is about 11 db more sensitive at 10,000 c.p.s. than the prior art microphone. Furthermore, the horn coupled microphone has a frequency response almost independent of frequency.

What I claim as my invention is:
1. A device for measuring sound pressure levels comprising: a microphone; a uniform probe tube; and means for coupling the tube to the microphone, said means including a horn terminated by an acoustic resistance element, said horn having a small end adapted for connection to the probe tube, and a large end adapted for close coupling to said microphone and said resistance element.
2. A device as claimed in claim 1, wherein the horn is of exponential shape.
3. A device as claimed in claim 1, wherein the resistance is vented into a cavity.
4. A device as claimed in claim 1, wherein the horn is of exponential shape and the resistance is vented into a cavity.
5. A device as claimed in claim 1, wherein the resistance comprises an annular slot disposed immediately in front of the microphone.
6. A device for measuring sound pressure in confined regions comprising: a microphone having a diaphragm, an acoustic conduit comprising a uniform probe tube having one end adapted to be disposed in said region, and a horn element having a small end connected to the other end of the tube and a large end of area $S_2$ closely coupled to the microphone and an acoustic resistance providing a resistive impedance substantially the same as the characteristic impedance of the horn; and an acoustic enclosure into which said resistance is vented.
7. A device as claimed in claim 6, wherein the resistance comprises an annular slot disposed between said large end and the microphone.
8. A device as claimed in claim 7, wherein the annular slot is formed by a conical knife edge maintained a predetermined distance from an aperture in a flat plate disposed immediately adjacent the diaphragm of the microphone.
9. A device as claimed in claim 6, wherein the acoustic enclosure comprises a circuit consisting of two acoustic capacitances and one inertance.
10. A device as claimed in claim 7, wherein the acoustic enclosure comprises a circuit consisting of two acoustic capacitances and one inertance.
11. A device as claimed in claim 8, wherein the acoustic enclosure comprises a circuit consisting of two acoustic capacitances and one inertance.
12. A device for measuring sound pressure in confined regions comprising: a microphone having a diaphragm, an acoustic conduit comprising a uniform probe tube having one end adapted to be disposed in said region, and a horn element having a small end connected to the other end of the tube and a large end of area $S_2$ closely coupled to the microphone and an acoustic resistance R having a value of about $R=\rho c/S_2$ where $\rho$ is the density of the air, and $c$ is the sound velocity; and an acoustic enclosure into which said resistance is vented.
13. A device as claimed in claim 12, wherein the resistance comprises an annular slot disposed between said large end and the microphone.
14. A device as claimed in claim 13, wherein the annular slot is formed by a conical knife edge maintained a predetermined distance from an aperture in a flat plate disposed immediately adjacent the diaphragm of the microphone.
15. A device as claimed in claim 12, wherein the acoustic enclosure comprises a single acoustic capacitance of volume $V_2$ wherein $V_2 > S_2 c/2\pi\nu_0$ and $\nu_0$ is the lowest frequency to be measured.
16. A device as claimed in claim 1, wherein the resistance is vented into an acoustic circuit consisting of two acoustic capacitances and one inertance.
17. A device for measuring sound pressure in confined regions comprising: a microphone having a diaphragm, an acoustic conduit comprising a uniform probe tube having one end adapted to be disposed in said region, and a horn element having a small end connected to the other end of the tube and a large end of area $S_2$ closely coupled to the microphone and an acoustic resistance R having a value of about $R=\rho c/S_2$ where $\rho$ is the density of the air, and $c$ is the sound velocity; and an acoustic enclosure into which said resistance is vented, said enclosure comprising a first acoustic capacitance of volume $V_{2a}$ of the order of $S_2 c/2\pi\nu_c$ where $\nu_c$ is the horn cut-off frequency, and a second much larger acoustic capacitance coupled to said first capacitance through a damped inertance.

References Cited by the Examiner

UNITED STATES PATENTS

| | | | |
|---|---|---|---|
| 1,816,917 | 8/1931 | Smythe et al. | 181 |
| 1,895,442 | 1/1933 | Bowker | 181 |
| 1,924,091 | 8/1933 | Eisenhour | 181 |
| 2,394,613 | 2/1946 | Houlgate et al. | 181 |
| 2,739,659 | 3/1956 | Daniels | 181 |

OTHER REFERENCES

Hunter: Acoustics, Prentice-Hall, Englewood Cliffs, N.J., 1957, pp. 122, 123, 182–190 relied on.

BENJAMIN A. BORCHELT, *Primary Examiner.*

SAMUEL FEINBERG, *Examiner.*

W. KUJAWA, *Assistant Examiner.*